United States Patent Office
3,427,864
Patented Feb. 18, 1969

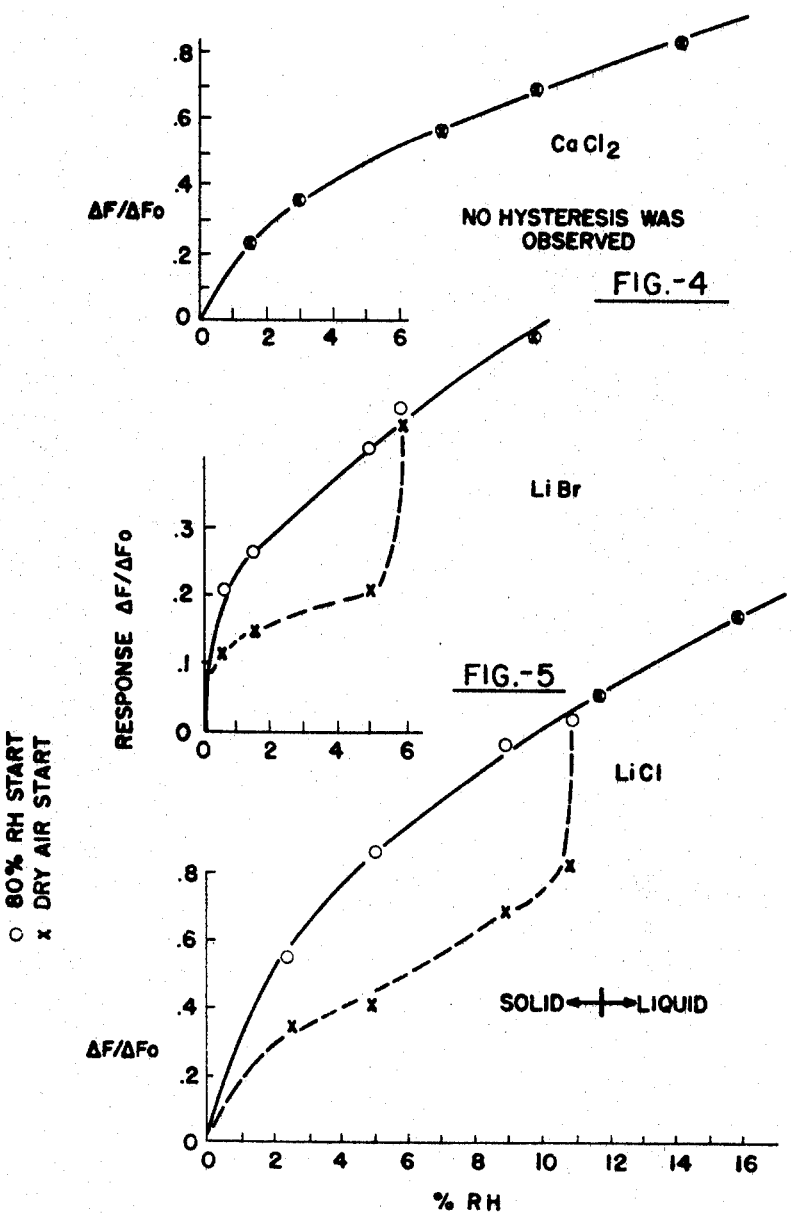

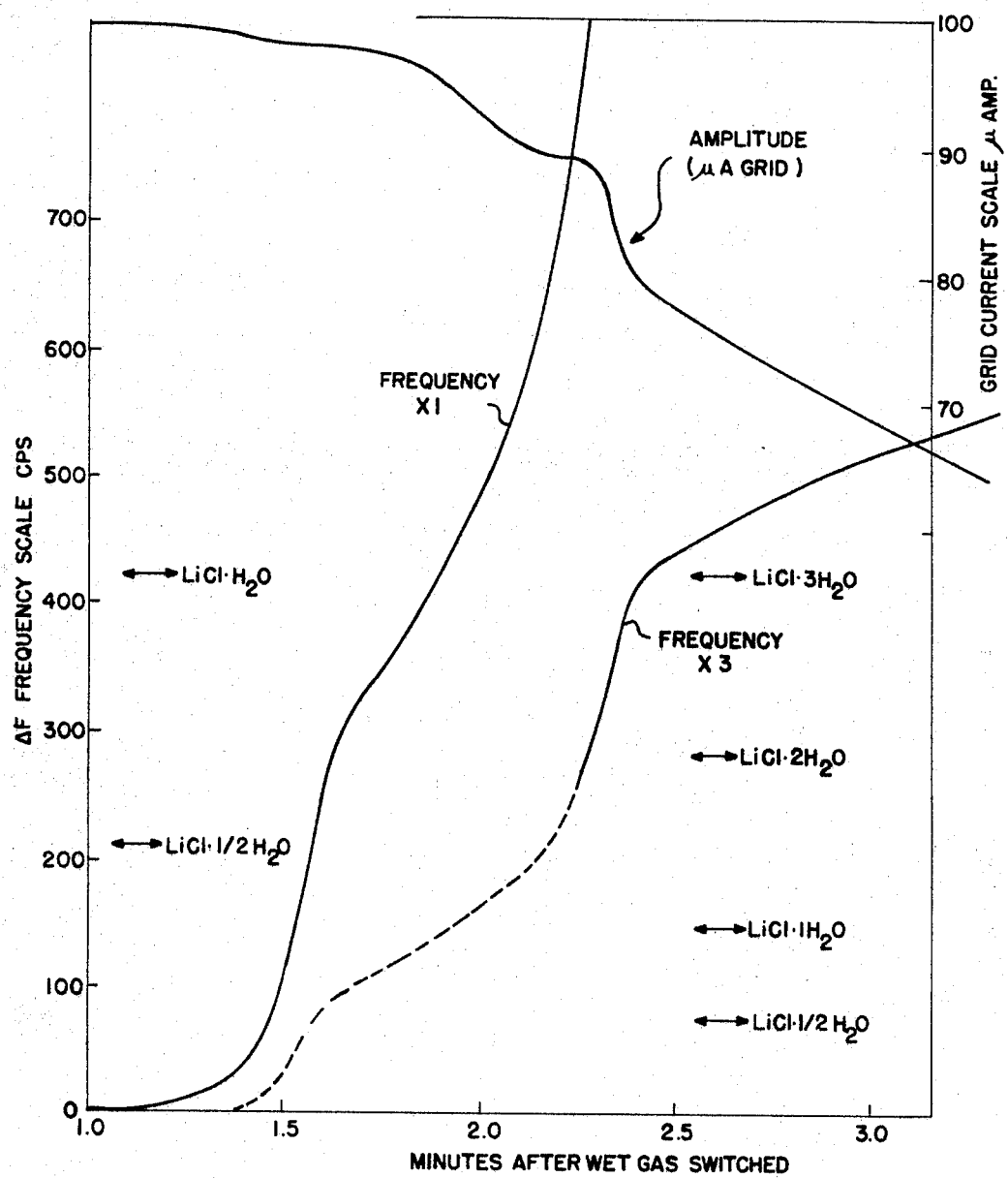

3,427,864
MOISTURE ANALYZER
William H. King, Jr., Florham Park, N.J., assignor to Esso Research and Engineering Company, a corporation of Delaware
Continuation-in-part of application Ser. No. 110,189, May 15, 1961. This application Aug. 21, 1964, Ser. No. 391,274
The portion of the term of the patent subsequent to Jan. 5, 1982, has been disclaimed
U.S. Cl. 73—29                    12 Claims
Int. Cl. G01n 27/00, 31/00

ABSTRACT OF THE DISCLOSURE

The instant disclosure is directed to an improved detector for use in a moisture analyzer. The improved detector comprises a piezoelectric crystal which has been coated with a deliquescent salt such as lithium chloride or calcium chloride. The improved detector of the invention is highly accurate and exhibits extremely fast response to changes in the amount of moisture present.

---

This case is a continuation-in-part of Ser. No. 110,189, filed May 15, 1961, now U.S. Patent No. 3,164,004.

This invention relates to a new and improved process and apparatus for the detection of moisture in fluid compositions. More specifically, this invention is concerned with the application of piezoelectric phenomena to the analysis of moisture in fluid mixtures. In particular, the present invention teaches new and improved coatings for piezoelectric materials, which coatings are highly sensitive to the presence of moisture in fluid mixtures. Additionally, the present invention involves a new method for observing hydrate formation in various substances.

The accurate and rapid detection of moisture content of fluid compositions is of great importance in industry. For example, in the aviation industry it is of extreme importance to constantly monitor the quantity of water in jet fuel. In the oil processing field, it is necessary in many applications to determine the amount of water present in feed streams of various catalytic reactions where the presence of an excessive amount of water might hinder or even prevent the catalytic reaction. Additionally, the determination of relative humidity is an important function in the forecasting of weather and also in those industries where hygroscopic or water-sensitive materials are being handled. Other uses and applications of the instant invention will appear subsequently in the specification.

The present case, as indicated above, is a continuation-in-part of Ser. No. 110,189, filed May 15, 1961. In that case it was disclosed that piezoelectric materials, when coated witht a substrate which is selective for a component present in a fluid mixture in contact with said piezoelectric material, will exhibit different vibrational frequencies and amplitudes in proportion to the quantity of said component present. Additionally, in a coassigned and copending case having the same inventor, Ser. No. 232,742, filed Oct. 24, 1962, now Patent No. 3,260,104, it was disclosed that improved results in analysis could be obtained by utilizing in combination two analyzers employing coated piezoelectric materials. One piezoelectric material is preferably coated with a substrate which interacts with the desired component in the fluid mixture and the other piezoelectric material is coated with a substrate which is inactive as to that component. By mixing the signals produced from the two said piezoelectric materials, it is possible to eliminate any variations in frequency due to changes in the temperature or pressure about the sensing material.

Briefly, the present invention involves an improvement in the coated piezoelectric materials which adapts the analyzer utilizing these materials to be particularly useful in the determination of moisture in fluid mixtures. It has now been found that coating a piezoelectric material with a deliquescent salt substrate results in a sensor which is both highly accurate and exhibits extremely fast response to changes in the amount of water vapor and gases.

The water vapor is reversibly sorbed and desorbed, causing a change in mass of the deliquescent salt substrate coating which affects the frequency of vibration of the piezoelectric material. Coating thicknesses of the deliquescent salt in the range between 10 to 2000 A., preferably 70 to 200 A. yield detectors of high sensitivity due to the fact that these salts pick up many times their own weight of moisture. The method is capable of indicating as little as 1 p.p.m. and can be employed up to 25,000 p.p.m. water. Generally, the piezoelectric material of choice will be a quartz crystal with a metal plated electrode thereon. Such crystals can have a natural oscillating frequency of about 9 megacycles.

The particular "responsive material" which may be employed in accordance with this invention is defined as any material which exhibits piezoelectric properties. A material exhibits piezoelectric properties if, when subject to mechanical pressure, it develops an electrical potential and, vice versa, when subject to an electrical potential, it mechanically deforms. Several such materials are known, for example, crystals such as quartz, tourmaline, and Rochelle salts and other materials such as barium titanate. Quartz is the particular crystal most often employed in electrical applications, but the instant invention is not to be limited thereto.

The particular frequency at which the quartz crystal piezoelectric material oscillates is dependent upon several factors, for example, the thickness of the material, the particular axis at which it was cut along, the electrode structure, the characteristics of the associated circuit, temperature, etc. If it is desirable to have a circuit of extremely high stability, it is often advantageous to maintain the piezoelectric material and its associated parts in a thermostatically controlled oven.

"Substrate" as used in the instant invention shall be taken to mean a thin film or coating deposited in predetermined quantity on the electrode of or on the piezoelectric material depending on the crystal design.

In preferred embodiments of moisture or relative humidity detectors of the present invention, it is contemplated that a quartz crystal piezoelectric material is coated with a thin film of a deliquescent material. Preferable forms of deliquescent materials include the deliquescent salts. It should be understood that by coating it is meant that either the entire crystal be covered with a continuous coating or, and more preferably, only a selected area such as that formed by the electrode structure on the crystal be coated with a substrate.

TABLE I.—SALTS SHOWING DELIQUESCENT SPECIES

| | F- | Cl- | Br- | I- | NO3- | SO4- | PO4- | CO3- | CN- | C2H3O2- |
|---|---|---|---|---|---|---|---|---|---|---|
| NH4+ | D | | | | | | | | | |
| Li+ | | D | D | D | D | | | | | |
| K+ | D | | | | | D | | D | | D |
| Na+ | | D | D | | | | | | | |
| Ca+ | D | D | D | | | | | | | |
| Ba+ | | | D | | | | | | | |
| Mg++ | D | D | D | D | D | | | | | |
| Fe++ | D | D | D | D | D | | | | | |
| Cu++ | D | D | | D | | | | | | |
| Zn++ | D | | D | | | | | | | |

The deliquescent substrate, preferably a deliquescent salt, employed in the practice of the present invention generally has the empirical structure of $A_xB_y$, wherein A represents a cationic moiety and B represents anionic moiety, and $x$ and $y$ are the stoichiometric numbers. Combinations which can be utilized as deliquescent salts are marked D in Table I. There are, of course, many combinations which can be made of these anions and cations and not all salts so produced are deliquescent. There are also many other useful anions and cations which are not shown here. Ammonium fluoride and lithium chloride are important because they produce the largest fractional weight increase per mol of water added. The calcium salts are preferred from a "hysteresis" standpoint which will be discussed later. In general, the salt to use will depend on experimental conditions and similar requirements. Some of the salts not indicated by D on Table I are hygroscopic and could be used as water sensing substrates but the amount of water pickup is small, therefore, these detectors would not be as desirable as those made from deliquescent salts.

The amount of deliquescent salt substrate used generally covers the range between 1 to 50 micrograms per square centimeter of area covered. Larger amounts can be used but difficulty is then often encountered in maintaining the responsive material in a condition of stable oscillation. The more the substrate, the higher the sensitivity, but stability and time constant become problems. Therefore, the amount is chosen experimentally for best compromise. The advantages obtained by utilizing deliquescent salts are obvious in this light. Since such salts, e.g., lithium chloride or calcium chloride, adsorb many times their own weight of water, the amount of substrate needed to yield a highly sensitive detector is maintained at minimum. The substrate is coated on the desired area, e.g., on the responsive material or on the electrode surface, so as to form a relatively thin film. Coating thicknesses of between 10 to 2000 A. thick, preferably 70 to 200 A. are utilized. It is desirable to evenly coat the surface so as to properly activate the material.

The method of coating the responsive material, e.g., the piezoelectric crystal, is not critical provided the said material remains undamaged after coating. It must oscillate with the coating applied. With liquid substrates, a typical procedure is as follows; using a microsyringe a few microliters of a solution of substrate in a volatile solvent are dropped on the surface of the piezoelectric material. When the solvent evaporates, the substrate spreads out slowly and covers the surface uniformly. If the substrate liquid is relatively viscous, this may take as long as 2 or 3 days, depending on the temperature. In such cases, the spreading process can be speeded up by placing the coated crystal in an oven at between 150° F. to 250° F., depending on the viscosity.

Solid substrates can be applied with cement or similar adhesives. Some very fine powders or crystals may be deposited from solutions, sols, and suspensions. Additionally, thin films can be deposited by vacuum evaporation of the solid onto the desired surface. Use of masks insure coating only those areas desired. Additionally, vacuum evaporation allows precise control over the thickness of the coating surface because the frequency can be observed during the coating process. In addition, many other techniques could be devised by one skilled in the art.

A better understanding of the instant invention may be achieved with reference to the attached figures.

FIGURES 4, 5 and 6 are graphs indicating "hysteresis" tests at low humidities of quartz crystals coated with calcium chloride, lithium bromide and lithium chloride respectively.

FIGURE 11 indicates a graph containing the simultaneous recordings of amplitude and frequency of a lithium chloride detector when switching from dry gas to wet gas at a flow rate of 10 cc./min.

Figure 1:
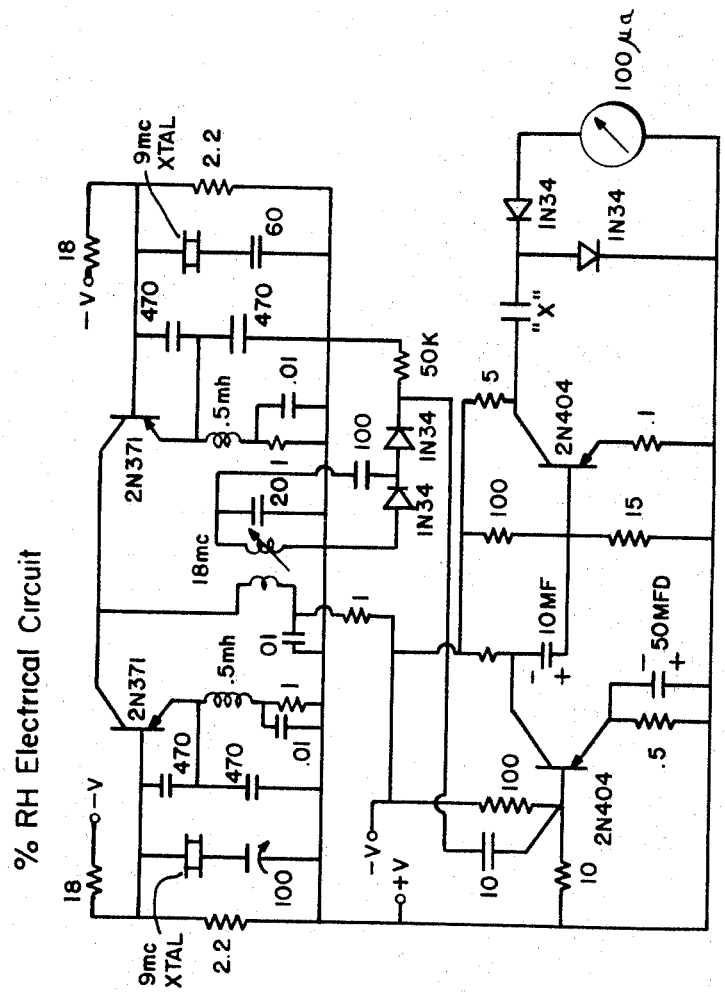
FIGURE 1 illustrates a schematic of a typical crystal oscillator detector circuit.

Turning now to FIGURE 1, there is depicted a specific embodiment of a typical oscillator circuit which may be used in accordance with the instant invention.

This circuit contains two crystal oscillators, a mixing circuit and a frequency to analog circuit which are convenient to use to obtain a meter indication of the frequency difference between the two crystals. Each 2N371 transistor oscillator circuit is a modified Pierce circuit well known in the art. The small capacitors in series with the crystals are used to adjust the frequency difference to some convenient point. Zero difference when dry gas is being detected is such a convenient point. In one mode of operation one crystal is coated and the other not. Thus, a frequency difference will exist when the gas being examined contains moisture. The collectors of the oscillators are connected together and inductively coupled to a tank circuit which feeds a pair of 1N34 diodes, whose function is to demodulate the audio frequency difference between the two radio frequencies. The tank circuit is tuned to the second harmonic of the crystals RF signals. This aids to decouple the oscillators and to provide multiplication of the frequency difference. Other harmonics can be used but the audio signal level falls off rapidly above the third harmonic with the particular circuit shown.

The two 2N404 transistors comprise an audio amplifier with sufficiently high gain that the output signal fed to capacitor X is a square wave of fairly constant amplitude. The 1N34 diodes connected to X separate the equal positive and negative discharge and charge current pulses of capacitor X. The indicating meter cannot follow these sharp pulses and therefore assumes a current indication proportional to the rate of curent pulses. Thus, the frequency difference between the crystals has been converted to an analog output. Typical values for X are 0.03 mf. for 100 c.p.s. fullscale and .001 mfd. for 3000 c.p.s. fullscale.

In addition, it should be emphasized that the particular type of oscillator circuit within which the crystal is placed is not critical. There are many such oscillators which may be used, for example, the Hartley oscillator and its many modifications, the tuned grid-tuned plate oscillator, the Dynatron oscillator, the transition oscillator and many forms of other feedback oscillators. The choice of the oscillator depends on the particular stability requirements and convenience of the user. The necessary modifications of oscillator circuits required to secure high efficiency and stability are well within the knowledge of those skilled in the art.

Figure 2:
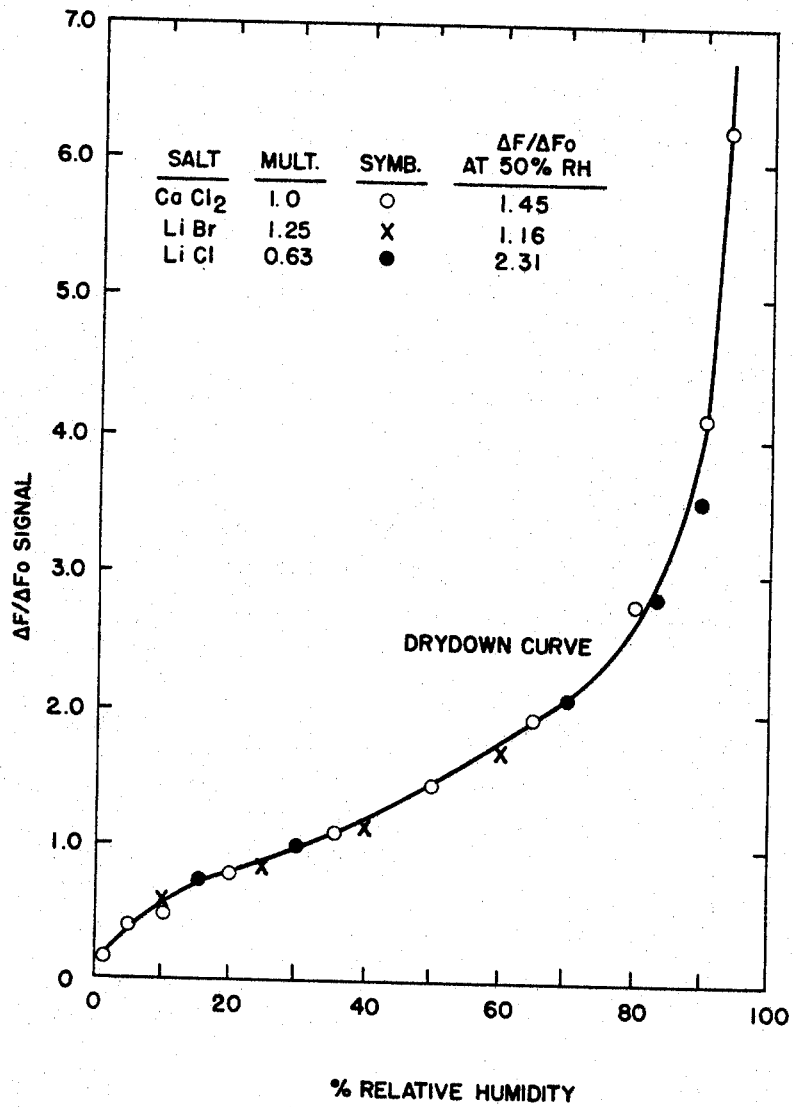
FIGURE 2 represents a graph showing the sensitivity of quartz crystals coated with calcium chloride, lithium bromide, and lithium chloride deliquescent salts in response to changes in the percent relative humidity.

FIGURE 2 shows a graph representing the isotherms of various deliquescent salts measured on coated quartz crystals.

Each detector discussed here was coated by vacuum depositing the salt on both sides of ½" diameter, 9 mc. at. cut 5/16" gold electrode crystals. The amount of coating was measured during the coating process by observing the frequency change. In most cases, $\Delta F_0$ coating values of 1000 cps. were obtained by coating 500 cps. on each side of the crystals. Small masks were employed to define the area of coating on the electrode surfaces. The polymer coated crystals were of similar construction but the coating technique involved spraying a polymer solution, drying and observing the frequency to control the coating thickness. All detectors were housed in their standard HC6/U containers fitted with gas conduits. The pressure, temperature and humidity of the gas flowing over the detector was controlled and changed in order to observe the response.

The graph of FIGURE 2 was obtained by plotting the ratio of $\Delta F/\Delta F_0$. The definition of $\Delta F$ is the change in frequency signal observed for a coated crystal due to the sorption thereon of the component to be measured, which in this case was water sorption. On the other hand, $\Delta F_0$ is the change in frequency observed between an uncoated quartz crystal and the same crystal coated with the dry deliquescent substrate. The curve represented in the graph of FIGURE 2 is in fact a series of curves superimposed on each other. These curves have the same shape for calcium chloride, lithium bromide and lithium chloride. The superimposing was accomplished by standardizing the values at 50% relative humidity with the calcium chloride value being arbitrarily selected as the basis. Thus, at 50% relative humidity calcium chloride coated crystals show a $\Delta F/\Delta F_0$ of 1.45. In comparison to this, the lithium bromide and lithium chloride coated crystals show values of 1.16 and 2.31 respectively. Each data point for lithium bromide was then multiplied by a factor representing the ratio of the 50% relative humidity factors of lithium bromide and calcium chloride or a multiplication factor of 1.25. The data points for lithium chloride were multiplied by a ratio of the calcium chloride to the lithium chloride 50% relative humidity ratio or a multiplying factor of 0.63.

It is evident upon inspection of the graph of FIGURE 2 that each of the aforementioned deliquescent salts yields the same shape curve and therefore are extremely well suited as detectors for changes in percent relative humidity. It should be noted that above about 90% relative humidity the detectors become supersensitive and therefore very small changes in the relative humidity yield disproportionately large $\Delta F/\Delta F_0$ signals.

Figure 3:
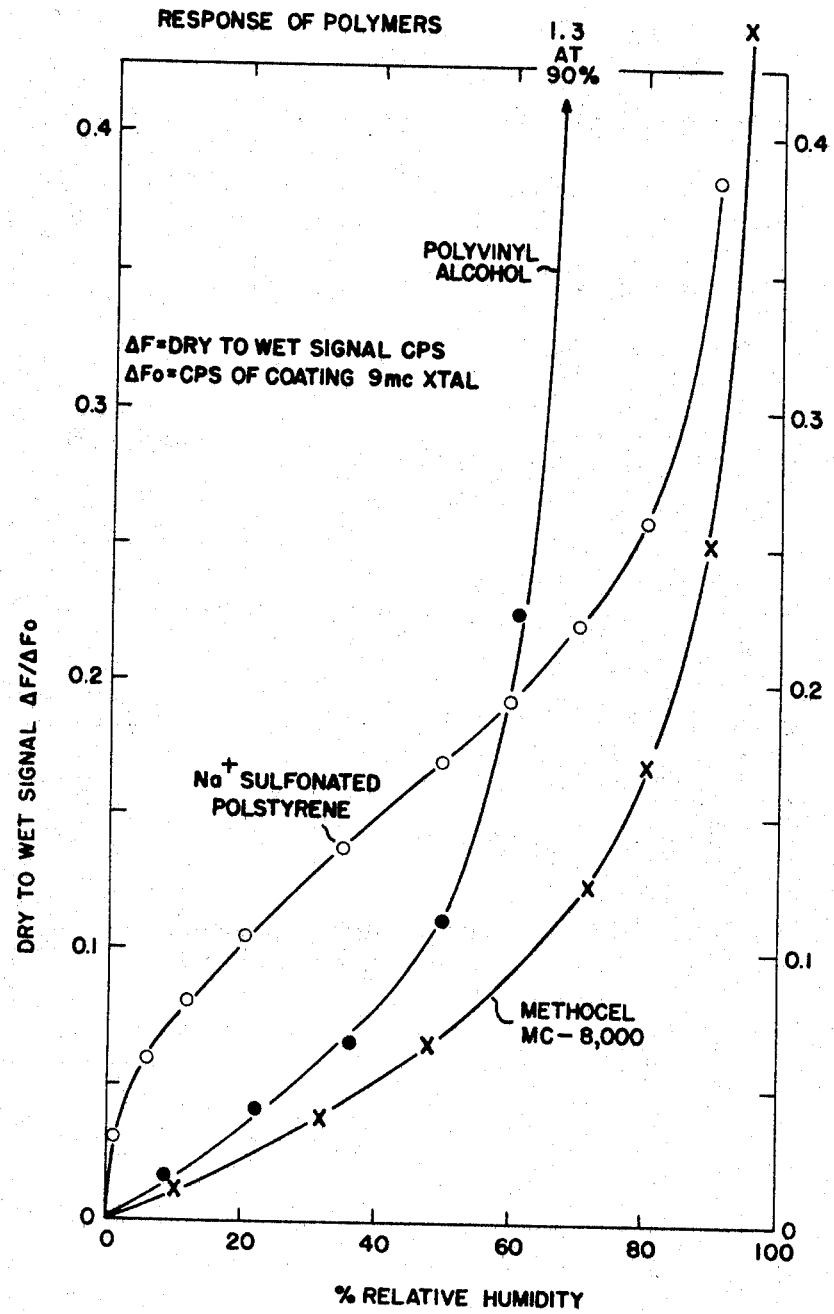
FIGURE 3 shows a graph indicating the comparative sensitivity of various quartz crystals coated with polymers selective to water at various percent relative humidity.

Referring now to FIGURE 3, a graph showing the sensitivity of various organic polymers coated on quartz crystals to changes in the relative humidity is described. The polymer substrates utilized were the sodium form of sulfonated polystyrene, polyvinyl alcohol and Methocel (methyl cellulose).

The data graphed in FIGURE 3 was obtained by running from the dry state to the higher relative humidity states. The $\Delta F/\Delta F_0$ ratio value at 50% relative humidity for the sulfonated polystyrene is about 0.17, for the polyvinyl alcohol 0.12 and for the Methocel 0.06. Thus, the best polymer value is still seen to be inferior to the sensitivity obtained by the deliquescent salts by a factor of about 1 to 10. These polymers and others of a similar nature are valuable as binding agents for the deliquescent salts. If a deliquescent salt is mixed with polyvinyl alcohol, there is less tendency for the salt to run or drip off the crystal at high humidities. Because the polymers are tenfold less sensitive than deliquescent salts, they do not materially interfere with the detection characteristics of the salts. This point will be elaborated on in a subsequent paragraph.

The solid substrates and polymer coatings suffer from a deficiency not evident from the graph of FIGURE 3. This deficiency results from the well known phenomena labeled "hysteresis" which name is used for convenience. The "hysteresis" phenomenon can be described as the difference in signal or indicated value observed in a coated crystal at a given percent relative humidity when that crystal has, on one hand, been exposed initially to a dry atmosphere and then allowed to wet up to that relative humidity and, on the other hand, when that crystal has been initially exposed to a relatively high relative humidity and then dried down to the test level. In other words, the frequency curve will be different depending on whether you are drying down or wetting up through a particular relative humidity range.

It is believed that the "hysteresis" effect of the sulfonated polystyrene coatings is probably due to rapid polymer swelling at high humidities which requires a long relaxation time under drying conditions. While in the swollen state, the polymer is more sensitive to water because the polymer chains are "uncoiled" and the $SO_3Na$ groups can associate themselves with more water molecules. The swollen state is reached rapidly because the polymer viscosity is lower at high humidities. When the humidity is suddenly changed to low levels (1000 p.p.m.), the polymer tends to stay swollen since it is dehydrated rapidly and its viscosity is then very high. Therefore, in the drier state the polymer requires a long time (6 hours) to assume its denser and less sensitive form. This "hysteresis" effect is observed for many polymers over a relatively extended relative humidity range, e.g., 5% to 80%.

The deliquescent salt substrates were tested for "hysteresis" and the results obtained are shown in FIGURES 4, 5 and 6. The data points representing drydown from an 80% relative humidity start are represented by circles with dots in them (⊙). The dry air starts and subsequent wet-up data points are indicated by crosses (+). In FIGURE 4, it can be seen that the two sets of data points overlap for a calcium chloride substrate. Thus, no "hysteresis" is observed for this deliquescent salt.

The lithium bromide coated crystal shows a "hysteresis" induced frequency variation below a relative humidity of about 6%. However, at relative humidities of a higher value the data points overlap thus showing no "hysteresis" effects. Thus, when utilizing a lithium bromide substrate to test for moisture content below a relative humidity value of 6% it is necessary to indicate whether the test is being run on a drydown or a wet-up basis. These results still compare very favorably with the far more extensive "hysteresis" effect observed for the polystyrene and methyl cellulose polymers.

In FIGURE 6 the graph representing the frequency response of a lithium chloride coated quartz crystal is shown. "Hysteresis" is observed for this system at relative humidity values lower than about 12%. This corresponds rather closely with the solid liquid transition in hydrated lithium crystals. Thus, this physical transition may possibly play a part in the reason for the "hysteresis" being observed.

The choice of calcium chloride as a deliquescent salt substrate of preference results from the fact that no "hysteresis" is observed as compared to the other salts (see FIGURES 4 through 6). Tests were run on calcium chloride coated crystals to determine their stability as to the variables of aging, temperature and exposure to relative high humidities.

Data was obtained under the following conditions: varying humidities at a temperature of 75° F. on the first day after coating, 3 days after coating, and after soaking at 68% relative humidity, and after 2 days soaking at 80% relative humidity. Data are also shown for varying humidity at a temperature of 35° F. 9 days after the crystal was coated, and varying humidity at 102° F. 8 days after the crystal was coated.

Figure 7:
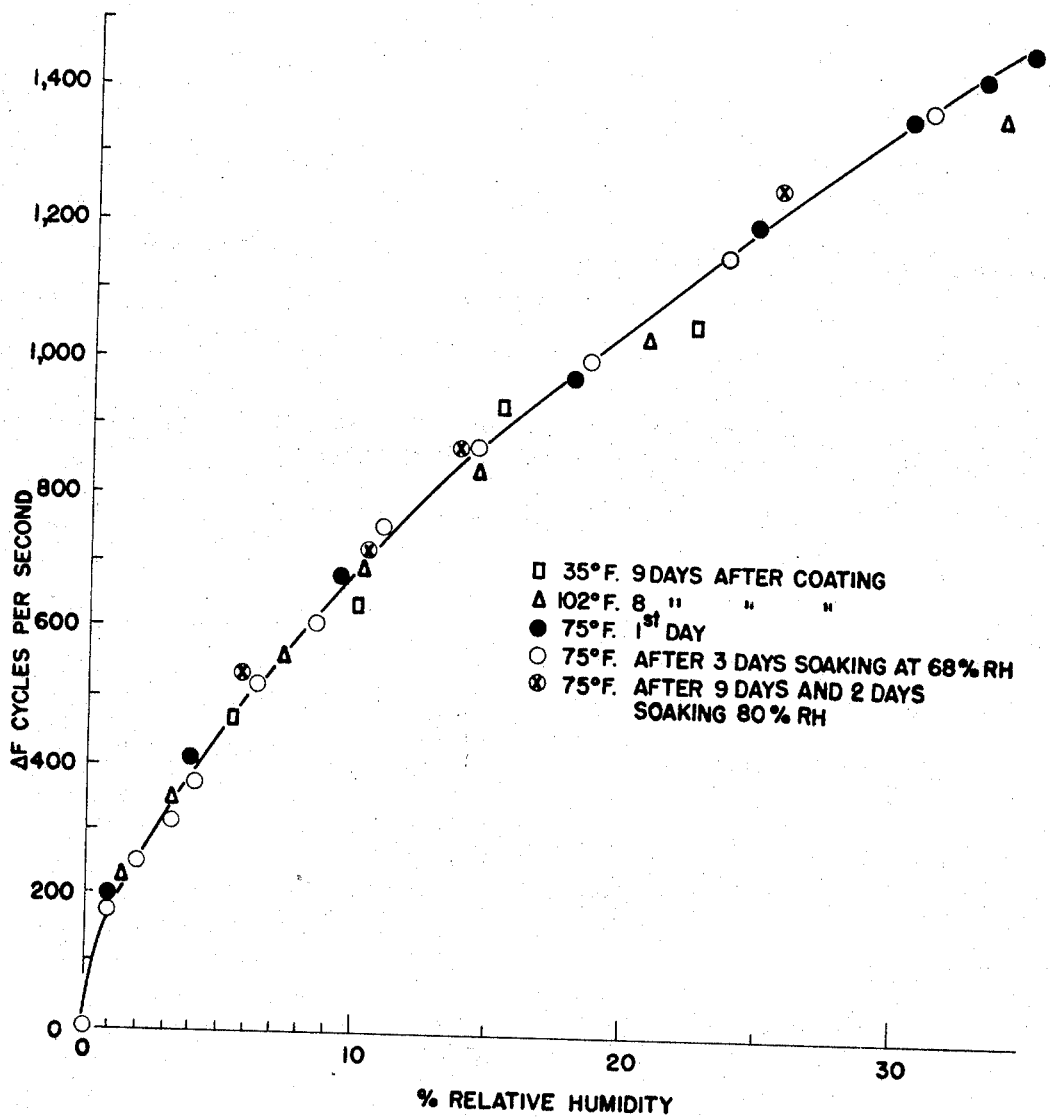
FIGURE 7 represents a graph showing calibration data on a calcium chloride coated quartz crystal which has been subjected to age, temperature and soaking tests.

FIGURE 7 describes a graph wherein the data obtained from the aforementioned tests are assembled. The results indicate that substantial variations in the history of the coated crystal does not cause any noticeable deviation in the resulting calibration curve. Thus, calcium chloride coated crystals have a high degree of stability and as such are useful in detection devices to determine moisture content.

The ability of deliquescent salt detectors to sense relative humidity changes independent of temperature is an important property. The results obtained for calcium chloride crystals under different temperature conditions as shown in FIGURE 7 strikingly point out this.

Figure 8:
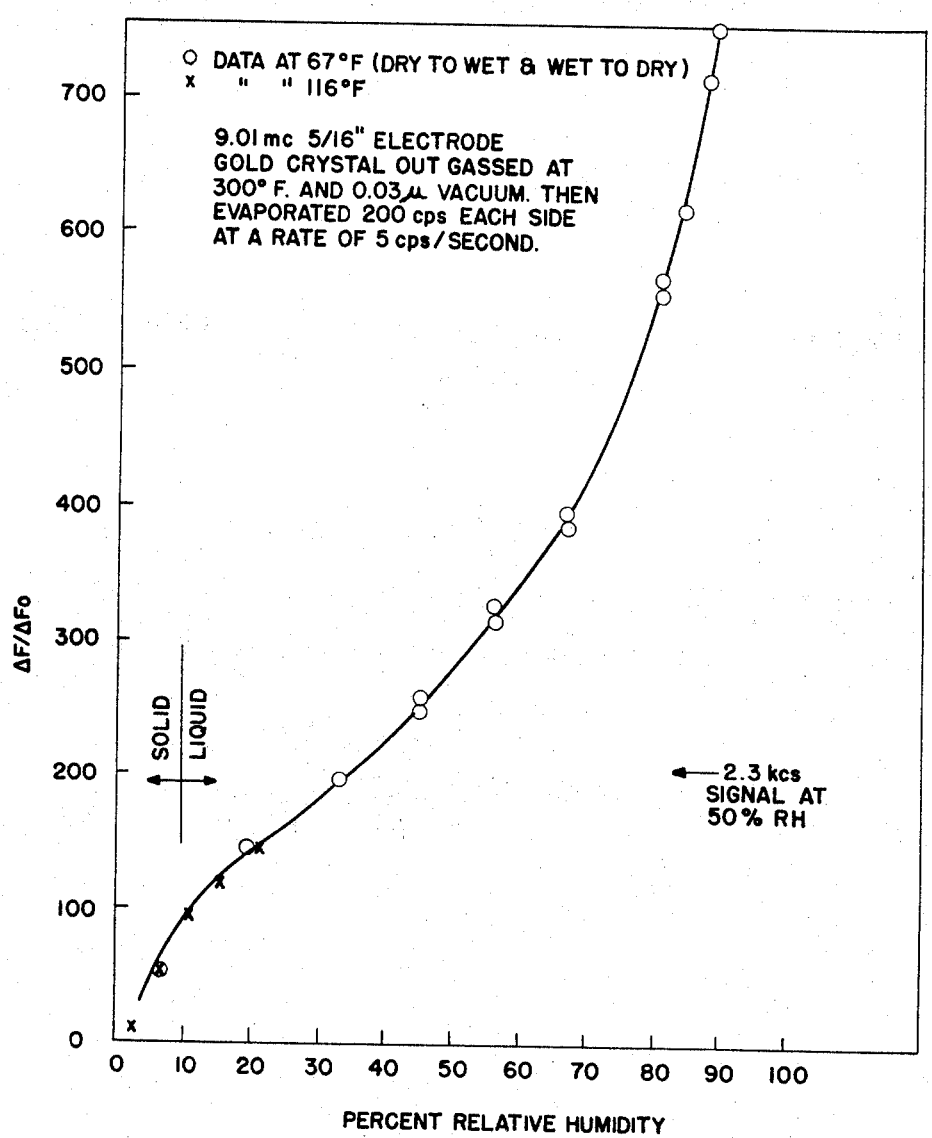
FIGURE 8 depicts a graph showing the calibration curves of lithium chloride coated quartz crystals at different temperatures.

Additionally, this effect has been shown for quartz piezoelectric crystals coated with lithium chloride salt. A 9.01 mc. crystal having a $5/16$ inch all-gold electrode was outgassed at 300° F. and 0.03 micron vacuum. Lithium chloride was then evaporated on each side at a rate of 5 cps./second until a total of 200 cps. of lithium chloride was evaporated on each side. The crystal was then exposed to an atmosphere having a variable relative humidity percentage. Runs were conducted at 67° F. and 116° F. The curves obtained from the data for each temperature run were compiled in FIGURE 8 and were found to be virtually superimposable thus showing that temperature variation does not affect the sensitivity of the lithium chloride detector as to moisture content.

The concept of the present invention can also be utilized to observe hydrate formation in such substances as deliquescent salts. It is well known that hydrates of molecular compounds form at critical points of temperature, humidity and pressure. By using a quartz piezoelectric crystal coated with the test compound to observe and identify the formation of particular hydrates, the critical point is, therefore, defined. For example, a quartz piezoelectric crystal having a natural frequency of 9 mc. and equipped with a gold electrode was coated by evaporating lithium chloride onto the crystal until a value of $\Delta F_0$ equivalent to 1004 cps. was obtained. The crystal was exposed to high percentages of relative humidity and then dried thoroughly. Next. the humidity was allowed to slowly increase. The parameters measured were the grid current in microamperes and the change in frequency in cycle per second. The data obtained is graphically reproduced in FIGURE 9.

As indicated by said figure, increasing the percent relative humidity results in an increase in the $\Delta F$ frequency signal corresponding with an increase in the hydrate state of the lithium chloride substrate. The grid current is seen to decrease while the percent relative humidity is increased. This is due to the fact that the grid current is a direct measurement of the amplitude of vibration. As the substrate coating becomes more liquid, with the water picked up, there is a tendency for the vibrations of the crystal to become more damped. The stable lithium chloride hydrate states are marked at the frequency where they should occur on the curve. These points were determined by means of the following equation relating the change in frequency with the change in mass of the substrate:

$$\Delta F = \Delta F_0 \times \Delta W / \Delta W_0$$

where:

$\Delta F$=frequency change due to sorbed weight $\Delta W$
$\Delta F_0$=frequency change due to coating $\Delta W_0$ weight.

Figure 9:
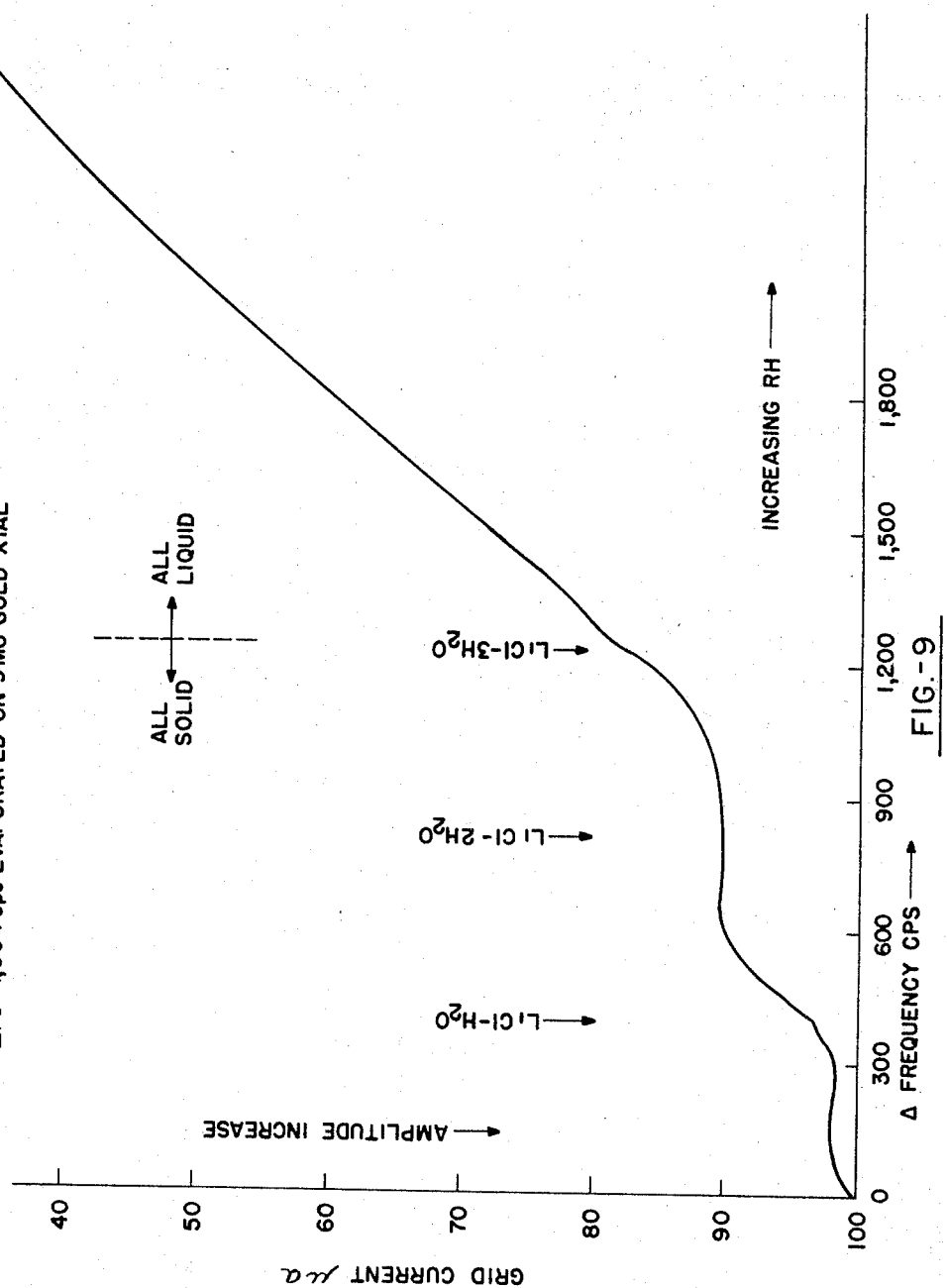
FIGURE 9 shows a graph wherein the hydrate states of the lithium chloride coating on a quartz crystal are depicted.

For example:

$$\Delta F = 1004 \Delta W / \Delta W_0$$

for the detector of FIGURE 9.

Since $\Delta W/\Delta W_0$ can be calculated from the known stoichiometric relationships of the hydrates $\Delta F$, the following table results:

TABLE II

| Change observed | $\Delta W/\Delta W_0$ | $\Delta F$ Signal |
| --- | --- | --- |
| LiCl→LiCl·H$_2$O | .425 | 425 |
| LiCl→LiCl·2H$_2$O | .850 | 855 |
| LiCl→LiCl·3H$_2$O | 1.27 | 1,280 |

From zero frequency to 425 c.p.s., the first hydrate LiCl·H$_2$O is forming. The second hydrate starts to form at 425 c.p.s. and completes at 855 c.p.s. Changes in the physical properties of these compounds are indicated by the amplitude plateaus. There probably would have been a third plateau for LiCl·3H$_2$O but the coating turned liquid at this point and increasing humidity from this point on decreased the amplitude linearly with the weight of water picked up. The critical point is indicated on FIGURE 9 as an abrupt change in the line curvature. The observation of such critical points has an advantage since the method is an absolute indication of humidity.

It was mentioned previously that the calibration curves for some salts showed a "hysteresis effect." During this investigation, a new hydrate form not previously known was observed. This state corresponds to LiCl·½H$_2$O and probably exists as multiples of LiClHOHClLi. The new form can only be observed when going from wet (above 12% RH) to very dry gas. This is evident from the following experiments. The LiCl coated crystal from the previous experiment ($\Delta F_0$=1 kc.) was contained in a constant temperature (75° F.) cell whose gas volume was 8½ cc. Dry or wet air was switched into the cell with a valve arrangement such that the total holdup volume of cell and conduits was about 10 cc. The grid current and the frequency change signals were simultaneously recorded with a two pen recorder as functions of time when the gas was switched from dry to wet and from wet to dry.

Figure 10:
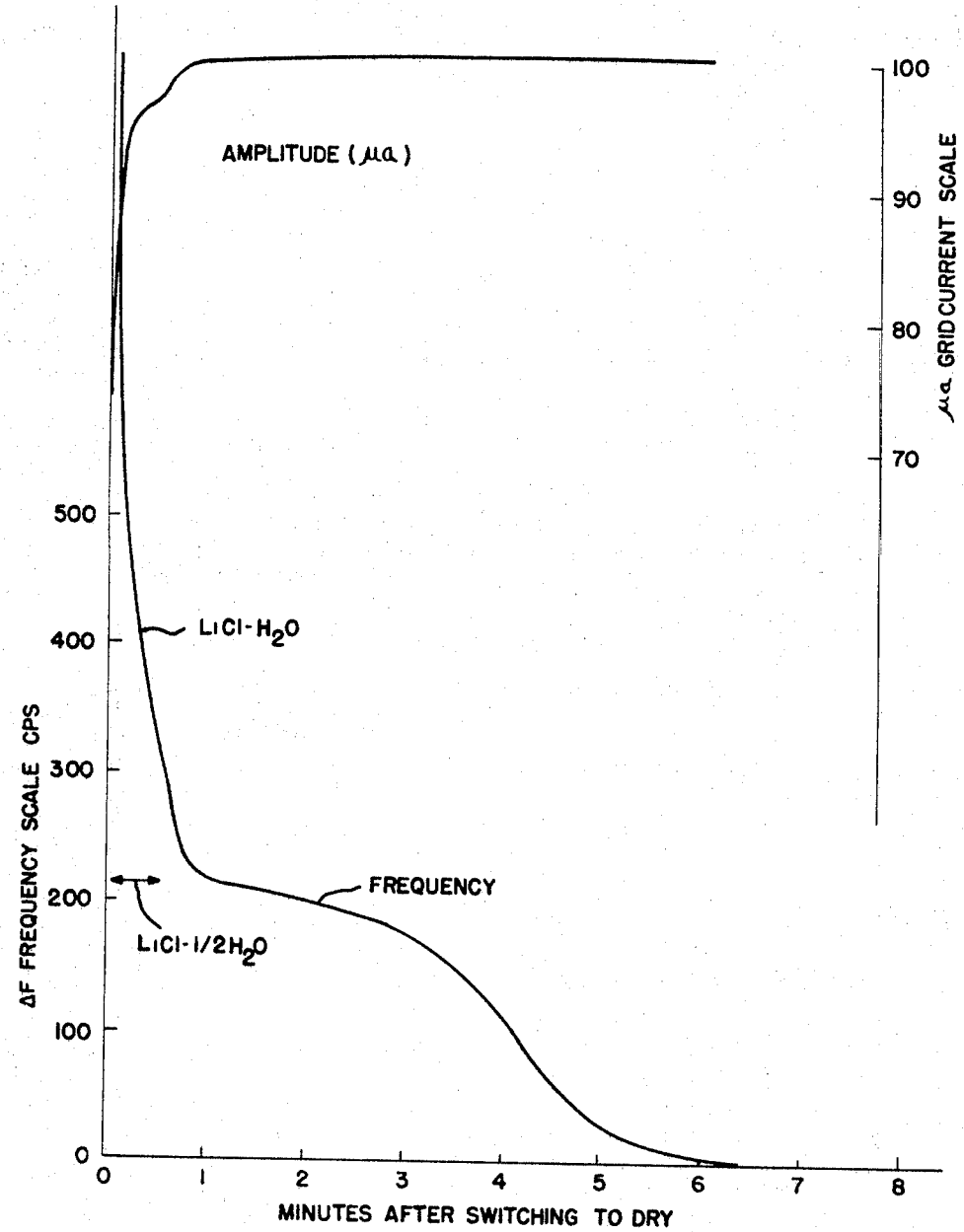
FIGURE 10 represents a graph showing simultaneous recordings of amplitude and frequency of a lithium chloride detector after switching from wet gas to dry gas at a flow rate of 230 cc./min.

FIGURE 10 shows these recordings on going from wet to dry. The amplitude of vibration rises rapidly to almost the final value indicating a very rapid transition from the liquid to solid state. In contrast to this, the frequency signal drops rapidly to a value corresponding to LiCl·½H$_2$O and then slowly releases water until the final dry condition is reached. At the temperature of this experiment almost 1500 cc. of dry gas was required to remove all the water from the LiCl. The frequency of the transition was not affected by the temperature of the experiment because a definite compound is formed but the amount of dry gas required to decompose the new hydrate was temperature sensitive. At 35° F., 8300 cc. of dry gas was required while at 90° F. only 100 cc. was adequate. The detail showing the other hydrates is covered up by the high flow rate required to show the new form (LiCl·½H$_2$O) in good perspective. Some indication of LiCl·H$_2$O is, however, evident.

FIGURE 11 is a wet up curve obtained under very carefully controlled conditions in an attempt to observe the ·½H$_2$O form under increasing humidity conditions. The figure shows the result. Only the LiCl·3H$_2$O hydrate shows up as a sharp transition or curvature change in both frequency and amplitude.

One possible problem that besets the use of deliquescent salts as coating agents for piezoelectric materials arises from the fact that the deliquescent salts may run if exposed to extremely high percentages of relative humidity for extended periods of time. For example, calcium chloride coated crystals may deteriorate after several days at 100% relative humidity because the calcium chloride hydrate liquefies and the solution on the crystal gathers and runs to one spot. This, of course, may make the crystal unusable for further work.

This problem can be overcome by adding thickening agents to the deliquescent salts. Suitable thickening agents for this purpose include polyvinyl alcohol, Methocel (methyl cellulose), Guartec (natural gum sugar), Carbopol (carboxy vinyl polymers), etc. These thickening agents are added to the deliquescent salt in an amount within the range of 5 to 85 wt. percent, preferably 20 to 60 wt. percent. The resulting deliquescent salt-polymer mixture will be stable to extended exposure at high relative humidities.

In summary, the advantages to be obtained are utilizing deliquescent salts as coatings for piezoelectric materials in the detection of the moisture content of fluids compared to the coatings previously disclosed are as follows:

(1) Deliquescent coatings are very substantially more sensitive to the moisture content of the test fluid;
(2) Deliquescent coatings are temperature independent; and
(3) Deliquescent coatings exhibit minimal "hysteresis" effects.

What is claimed is:

1. In a fluid detection device wherein the response of an electronic oscillation means is controlled by a piezoelectric element in which the surface of said element is coated with a substrate subjected to contact with the test fluid, the improvement wherein the substrate material comprises a deliquescent salt.

2. The improved detector of claim 1 wherein said deliquescent salt is a lithium halide.

3. The improved detector of claim 1 wherein the deliquescent salt is a calcium halide.

4. The improved detector of claim 3 wherein said calcium halide is calcium chloride.

5. An improved analyzer for moisture comprising in combination an electronic circuit oscillator means having a coated vibratable, piezoelectric material as a resonant element therein, the coating of said piezoelectric material being a deliquescent salt which will interact with the moisture in a fluid to be analyzed and whereby as a result of said interaction the oscillation of said circuit is changed, and means for detecting changes in the oscillation of said circuit.

6. The improved analyzer of claim 5 wherein said piezoelectric material is a quartz crystal and said deliquescent salt is a lithium halide.

7. The improved analyzer of claim 6 wherein said deliquescent salt is a calcium halide.

8. In a moisture analyzer comprising in combination an electronic circuit oscillator means having a vibratable piezoelectric element as a resonant element thereof, and means for detecting changes in the oscillation of said oscillator circuit, the improvement wherein said piezoelectric element has a substrate comprising a deliquescent salt coated thereon.

9. The improved analyzer of claim 8 wherein said piezoelectric element is a quartz crystal and said deliquescent salt substrate comprises calcium chloride and a stabilizing amount of a thickening agent.

10. In an electronic oscillator circuit having a vibratable piezoelectric material as a resonant element thereof, the improvement which permits such circuit to be used as a sensitive moisture analyzer wherein said piezoelectric element is coated with a deliquescent salt capable of interacting with said moisture, whereby as a result of said interaction the oscillation of said circuit is changed and means for detecting said change in oscillation.

11. The circuit of claim 10 wherein said piezoelectric material is a quartz crystal and said deliquescent salt is a lithium halide.

12. The circuit of claim 11 wherein said deliquescent salt is a calcium halide.

References Cited

UNITED STATES PATENTS

| | | | |
|---|---|---|---|
| 2,629,253 | 2/1953 | Deaton | 73—29 |
| 2,962,897 | 12/1960 | Muller | 73—336.5 |
| 3,022,667 | 2/1962 | Wexler et al. | 73—336.5 |
| 3,164,004 | 1/1965 | King | 73—23 |

JAMES J. GILL, *Primary Examiner.*